(12) United States Patent
Manhart (10) Patent No.: US 11,494,956 B2
(45) Date of Patent: Nov. 8, 2022

(54) COMPUTER-IMPLEMENTED METHOD FOR THE RECONSTRUCTION OF MEDICAL IMAGE DATA

(71) Applicant: Siemens Healthcare GmbH, Erlangen (DE)

(72) Inventor: Michael Manhart, Fürth (DE)

(73) Assignee: Siemens Healthcare GmbH, Erlangen (DE)

( * ) Notice: Subject to any disclaimer, the term of this patent is extended or adjusted under 35 U.S.C. 154(b) by 93 days.

(21) Appl. No.: 16/997,909

(22) Filed: Aug. 19, 2020

(65) Prior Publication Data

US 2021/0056735 A1 Feb. 25, 2021

(30) Foreign Application Priority Data

Aug. 23, 2019 (EP) ..................................... 19193250

(51) Int. Cl.
*G06K 9/00* (2022.01)
*G06T 11/00* (2006.01)

(52) U.S. Cl.
CPC .......... *G06T 11/008* (2013.01); *G06T 11/006* (2013.01); *G06T 2210/41* (2013.01)

(58) Field of Classification Search
CPC .................................................... G06T 11/008
See application file for complete search history.

(56) References Cited

U.S. PATENT DOCUMENTS

| 2013/0343673 A1* | 12/2013 | Pal | ........................ | G06T 11/003 |
| | | | | 382/298 |
| 2014/0369581 A1* | 12/2014 | Fu | ......................... | G06T 11/006 |
| | | | | 382/131 |

(Continued)

FOREIGN PATENT DOCUMENTS

EP 3706081 A1 9/2020

OTHER PUBLICATIONS

Aichert, André, et al. "Epipolar consistency in transmission imaging." IEEE transactions on medical imaging 34.11 (2015): 2205-2219.

(Continued)

*Primary Examiner* — Oneal R Mistry
(74) *Attorney, Agent, or Firm* — Lempia Summerfield Katz LLC (57) ABSTRACT

A computer-implemented method for reconstruction of medical image data includes receiving medical measuring data, and minimizing a cost value via gradient descent. Minimizing the cost value includes: reconstructing the medical image data by applying a reconstruction function to the received medical measuring data in accordance with reconstruction parameters; determining a cost value by applying a cost function to the reconstructed medical image data; determining a gradient of the cost function with respect to the reconstruction parameters; adjusting the reconstruction parameters based on the gradient of the cost function with respect to the reconstruction parameters and the previous reconstruction parameters; and providing the adjusted reconstruction parameters. The acts of the minimizing are repeated until a termination condition is met. The reconstructed medical image data is provided.

17 Claims, 7 Drawing Sheets

(56) References Cited

U.S. PATENT DOCUMENTS

| | | | |
|---|---|---|---|
| 2015/0030227 A1* | 1/2015 | Liang | A61B 6/032 |
| | | | 382/131 |
| 2019/0104940 A1* | 4/2019 | Zhou | G06T 11/005 |
| 2019/0228547 A1* | 7/2019 | Chandarana | G01R 33/5608 |
| 2020/0286264 A1 | 9/2020 | Kaethner | |
| 2020/0305806 A1* | 10/2020 | Tang | A61B 6/5205 |

OTHER PUBLICATIONS

European Search Report for European Application No. 19193250.8-1210 dated Jan. 24, 2020.

Frysch, Robert, and Georg Rose. "Rigid motion compensation in interventional C-arm CT using consistency measure an projection data." International Conference on Medical Image Computing and Computer-Assisted Intervention. Springer, Cham, 2015. pp. 298-306.

Duadah, Sarah, et al. "Correction of patient motion in cone-beam CT using 3D-2D registration." Physics in Medicine & Biology 62.23 (2017): 8813-8831.

Preuhs, Alexander, et al. "Deep autofocus with cone-beam CT consistency constraint." Bildverarbeitung für die Medizin 2020. Springer Vieweg, Wiesbaden, 2020. 169-174.

Preuhs, Alexander, et al. "Double your views-exploiting symmetry in transmission imaging." International Conference an Medical Image Computing and Computer-Assisted Intervention Springer, Cham, 2018. pp. 356-364.

Preuhs, Alexander, et al. "Maximum likelihood estimation of head motion using epipolar consistency." Bildverarbeitung für die Medizin 2019. Springer Vieweg, Wiesbaden, 2019. 134-139.

Preuhs, Alexander, et al. "Motion gradients for epipolar consistency." 15th International Meeting on Fully Three-Dimensional Image Reconstruction in Radiology and Nuclear Medicine. vol. 11072. International Society for Optics and Photonics, 2019. pp. 1-4.

Preuhs, Alexander, Michael Manhart, and Andreas Maier. "Fast epipolar consistency without the need for pseudo matrix inverses." arXiv preprint arXiv: 1806.02637 (2018). pp. 1-4.

Rumelhart, David E., Geoffrey E. Hinton, and Ronald J. Williams. "Learning representations by back-propagating errors " nature 323. 6088 (1986): 533-536.

Sisniega, Alejandro, et al. "Motion compensation in extremity cone-beam CT using a penalized image sharpness criterion." Physics in Medicine & Biology 62.9 (2017): 3712-3734.

Unberath, Mathias, et al. "Prior-free respiratory motion estimation in rotational angiography." IEEE transactions on medical imaging 37.9 (2018): 1999-2009.

\* cited by examiner

COMPUTER-IMPLEMENTED METHOD FOR THE RECONSTRUCTION OF MEDICAL IMAGE DATA

This application claims the benefit of European Patent Application No. EP 19193250.8, filed Aug. 23, 2019, which is hereby incorporated by reference in its entirety.

BACKGROUND

The present embodiments relate to reconstruction of medical image data.

A high image quality is essential for the analysis and evaluation of medical image data of an examination object.

Medical measuring data (e.g., raw data) of the examination object is frequently recorded by a medical imaging device (e.g., a magnetic resonance system and/or an x-ray device and/or a computed tomography system). A reconstruction of the medical image data from the medical measuring data may then take place. High consistency and precise knowledge of the recording parameters (e.g., a recording geometry) is to be provided for the artifact-free reconstruction of the medical image data.

In reconstructed medical image data, artifacts may occur, for example, as a result of inconsistencies between recording parameters for recording the medical measuring data and reconstruction parameters for the reconstruction of the medical image data. A movement of the examination object may result in image artifacts after reconstruction of the medical image data, for example.

In order to improve the image quality of medical image data to be reconstructed, methods for prospective and/or retrospective movement correction are known from the prior art, for example. The known methods are, however, frequently unable to correct inconsistencies between the recording and reconstruction parameters.

Methods for improving the image quality of medical image data to be reconstructed, based on image quality metrics, are known from the prior art. In this regard, the high computing outlay for optimizing the image quality and the minimal stability is frequently disadvantageous.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a quality of medical image data to be reconstructed may be improved in a computationally efficient and reliable manner.

A computer-implemented method for reconstruction of medical image data, a computer program, a data memory, and a medical imaging device are provided.

Provision is made for the medical measuring data to be received. A cost value is minimized via gradient descent (e.g., by a drop in gradient). The cost value is minimized with a number of acts. In a first acts a), the medical image data including a number of image values is reconstructed by applying a reconstruction function to the received medical measuring data according to reconstruction parameters. After this, in a second act b), a cost value is determined by applying a cost function to the reconstructed medical image data. In a third act c), a gradient of the cost function is determined with respect to the reconstruction parameters. In a fourth act d), the reconstruction parameters are adjusted. The adjustment of the reconstruction parameters is based on the gradient of the cost function with respect to the reconstruction parameters and on the previous reconstruction parameters. In a fifth act e), the adjusted reconstruction parameters are provided. In order to minimize the cost value via gradient descent, the acts a) to e) are repeated (e.g., iteratively) until a termination condition is met. After this, the reconstructed medical image data from act a) is provided.

The medical image data reconstructed last in act a) is provided. The provision of the reconstructed medical image data may, for example, include a storage on a computer-readable memory medium and/or a display on a display unit and/or a transmission to a processing unit.

The medical measuring data of an examination object may be recorded and/or provided, for example, by a medical imaging device. The examination object may include, for example, an animal patient and/or a human patient and/or a phantom and/or a model.

The medical imaging device may be embodied, for example, as a medical x-ray device (e.g., as a C-arm x-ray device and/or Dyna-CT), and/or a magnetic resonance system (MRT), and/or a computed tomography system (CT), and/or an ultrasound device.

The medical measuring data may include, for example, a number of items of medical raw data. The number of items of medical raw data may, for example, correspond in each case to a recording geometry (e.g., a projection angle and/or mapping angle). The medical measuring data may be recorded and/or provided in the frequency space (e.g., k-space). The number of items of medical raw data of the examination object may, for example, be recorded in temporal succession. For example, the medical measuring data may include a number of slice images and/or projection x-ray images recorded, for example, with a recording geometry that differs at least partially from one another. The medical measuring data may include individual images and/or state images of a physiological scene recorded in temporal succession.

The medical measuring data may include metadata. The metadata may, for example, include an item of information relating to recording parameters and/or operating parameters of the medical imaging device.

The receiving of the medical measuring data may include, for example, a detection and/or reading-out of a computer-readable data memory and/or a receiving from a data memory unit (e.g., a database). The medical measuring data may be provided by a processing unit of the medical imaging device.

The medical image data may be reconstructed by applying the reconstruction function to the received medical measuring data according to the reconstruction parameters. The reconstruction function may include, for example, a mapping between the received medical measuring data from a dimension and/or a domain and/or a space of the medical measuring data into a dimension and/or a domain and/or a space of the medical imaging data. The reconstruction function may include, for example, a Fourier transformation and/or a Radon transformation and/or a filtered back projection.

The reconstruction parameters may be taken into account, for example, as arguments and/or input parameters of the reconstruction function. The reconstruction parameters may include recording parameters (e.g., an acquisition geometry and/or an item of positioning information and/or alignment information) and/or operating parameters of the medical imaging device (e.g., sequence parameters). The reconstruction function may be differentiated (e.g., constantly) in accordance with the reconstruction parameters.

The reconstructed medical image data in the associated image space may have a higher dimensionality compared with the medical measuring data. The reconstruction function may include a mapping between the medical measuring data in the frequency space (e.g., k-space) and the medical image data in the image space.

The medical image data may include a number of image values (e.g., pixels and/or voxels). A spatial resolution of the medical image data may, for example, be predetermined and/or limited by the reconstruction parameters and/or the recording parameters and/or the medical measuring data. The medical image data may include a mapping of at least one section of the examination object.

The cost value may include a value for the evaluation (e.g., standardized evaluation) of an image quality of the reconstructed medical image data. The cost function may, for example, map the reconstructed medical image data (e.g., the image values) as input data onto the cost value. The cost value may be embodied as scalar. The cost function may be embodied to evaluate a signal-to-noise ratio and/or a back projection error and/or a movement compensation and/or a characteristic of an image artifact in the reconstructed medical image data.

The determination of the gradient of the cost function with respect to the reconstruction parameters in act c) may include a determination of partial derivatives of the cost function with respect to the reconstruction parameters. The gradient of the cost function with respect to the reconstruction parameters may, for example, be embodied as a vector.

The adjustment of the reconstruction parameters in act d) may include an addition and/or multiplication of the previous reconstruction parameters and the gradients (e.g., scaled gradients) of the cost function with respect to the reconstruction parameters. The previous reconstruction parameters describe, for example, the reconstruction parameters used for the reconstruction of the medical image data in act a). By scaling the gradient of the cost function with respect to the reconstruction parameters, it is possible to adjust the minimization speed to the minimization of the cost value. By adjusting the reconstruction parameters based on the gradient of the cost function with respect to the reconstruction parameters, a reduction in the cost value may be enabled.

In act e), the reconstruction parameters for act a) adjusted in act d) may be provided for the repeated reconstruction of the medical image data from the medical measuring data. The provision of the adjusted reconstruction parameters may include, for example, a storage on a computer-readable memory medium and/or a display on a display unit and/or a transmission to a processing unit.

The cost value may be minimized by repeated (e.g., iterative) implementation of act a) to e), by adjusting the reconstruction parameters in every repetition (e.g., iteration). The adjustment of the reconstruction parameters may take place, for example, based on the gradient of the cost function with respect to the reconstruction parameters with the purpose of minimizing the cost value.

A particularly rapid (e.g., computationally efficient) and stable minimization of the cost value may be enabled in this way. A targeted and stable minimization of the cost value may be achieved, for example, by adjusting the reconstruction parameters based on the gradient of the cost function with respect to the reconstruction parameters.

The underlying mathematical optimization method is known, for example, from the prior art as a drop in gradient (e.g., gradient descent) and/or drop in gradient method.

In a further embodiment of the method, the termination condition may include a maximum number of repetitions and/or a threshold value with respect to the cost value. The termination condition may, for example, occur when the maximum number of repetitions of acts a) to e) is reached and/or exceeded and/or when the threshold value with respect to the cost value is reached and/or not met. By specifying a threshold value with respect to the cost value as a termination condition, an image quality (e.g., a minimum image quality may be predetermined for the reconstructed medical image data. The threshold value may, for example, be predetermined with respect to the cost value so that the image quality of the reconstructed medical image data corresponding thereto is suited to diagnostically supporting a medical operator. It is possible to limit the runtime of the proposed computer-implemented method by specifying a maximum number of repetitions as a termination condition. This may be advantageous, for example, in a clinical environment.

In a further embodiment of the method, the cost function may be based on an image quality metric.

The image quality metric may include, for example, a regression of a back projection error (e.g., with a movement correction). The image quality metric may be embodied to evaluate the image quality with respect to an x-ray beam hardening and/or a signal-to-noise ratio and/or a specification of image artifacts (e.g., metal artifacts). The image quality metric may include an entropy of a gray-scale value histogram and/or a total variation of the image values.

As a result of the cost function being based on the image quality metric, an objective evaluation of the image quality of the reconstructed medical image data may be enabled. In this way, for example, a comparability of the cost values determined by applying the cost function may be provided between different examination objects and/or imaging modalities and/or recording parameters and/or operating parameters of the medical imaging device.

In a further embodiment of the method, the cost function may include a trained function. The cost value may be determined by applying the trained function to input data. In this regard, the input data may be based on the reconstructed medical image data including a number of image values. At least one parameter of the trained function may be based on the image quality metric.

The cost function (e.g., the trained function) may be trained by a machine learning method.

For example, the cost function may be a neural network (e.g., a convolutional neural network (CNN)) or a network including a convolutional layer.

A trained function maps input data onto output data. In this regard, the output data may depend, for example, on one or more parameters of the trained function. The one or more parameters of the trained function may be determined and/or adjusted by a training. The determination and/or the adjustment of the one or the number of parameters of the trained function may be based, for example, on a pair including training input data and associated training output data, where the trained function for generating training mapping data is applied to the training input data. For example, the determination and/or the adjustment may be based on a comparison of the training mapping data and the training output data. A trainable function (e.g., a function containing one or more parameters yet to be adjusted) is also generally referred to as a trained function.

Other terms for trained function are trained mapping rule, mapping rule including trained parameters, function including trained parameters, algorithm based on artificial intelligence, and machine-learning algorithm. An example of a trained function is an artificial neural network, where the edge weights of the artificial neural network correspond to the parameters of the trained function. The term "neural net" may also be used instead of the term "neural network". For example, a trained function may also be a deep artificial neural network (e.g., deep neural network). Another example of a trained function is a "support vector machine," and, for example, other machine-learning algorithms may also be used as a trained function.

The trained function (e.g., the neural network) has an input layer and an output layer. The input layer may, for example, be embodied to receive input data. The output layer may be embodied to provide output data. The input layer and/or the output layer may include in each case, for example, a number of channels (e.g., neurons).

The cost function (e.g., the trained function) may be trained by training data records, where a training data record includes in each case input data based on reconstructed medical training image data. The reconstructed medical training image data may be, for example, simulated and/or reconstructed from simulated medical training measuring data. The training data records may include in each case a comparison cost value that corresponds to the respective reconstructed medical training image data. The comparison cost value may be determined by applying the image quality metric to the reconstructed medical training image data. At least one parameter of the cost function (e.g., of the trained function) may be based on a comparison of the cost value, which is determined by applying the cost function (e.g., the trained function) to the reconstructed medical training image data, with the corresponding comparison cost value.

In this way, a particularly reliable and comprehensive evaluation of the image quality of the reconstructed medical image data may be enabled by applying the cost function. As a result of the cost function being based on a trained function, an evaluation of the image quality of the reconstructed medical image data may be enabled with respect to a number of image features. For example, the cost function (e.g., the trained function) may be based on a number of image quality metrics. The cost function may therefore be embodied, for example, to evaluate the image quality of the reconstructed medical image data with respect to an x-ray beam hardening and/or a signal-to-noise ratio and/or a characteristic of image artifacts (e.g., metal artifacts).

In a further embodiment of the method, the minimization of the cost value via gradient descent may further include an act b2) for determining at least one consistency value by applying a consistency function to the measuring data in accordance with the reconstruction parameters. After this in act c), a gradient of the consistency function may be determined with respect to the reconstruction parameters. The act d) may also include an adjustment of the reconstruction parameters in addition based on the gradient of the consistency function with respect to the reconstruction parameters.

The consistency function may, for example, be differentiated (e.g., constantly) in accordance with the reconstruction parameters. The consistency function may be embodied to map the reconstruction parameters and the medical measuring data onto at least one scalar (e.g., the at least one consistency value) in order to evaluate a consistency between the reconstruction parameters and the medical image data. The evaluation of the consistency (e.g., with respect to a consistency condition) may, for example, include an epipolar consistency condition (e.g., in accordance with the Grangeat theorem) and/or a sampling consistency condition (e.g., in accordance with the Nyquist sampling theorem) and/or a symmetry consistency condition. The consistency between the reconstructed medical image data and the received medical measuring data may be determined, for example, by forward projection of the reconstructed medical image data.

The determination of the gradient of the consistency function with respect to the reconstruction parameters may include a determination of partial derivatives of the consistency function with respect to the reconstruction parameters. The gradient of the consistency function with respect to the reconstruction parameters may, for example, be embodied as a vector.

The adjustment of the reconstruction parameters in act d) may, for example, include in addition an adding and/or multiplication of the gradient (e.g., scaled gradient) of the consistency function with respect to the reconstruction parameters. The adjustment of the reconstruction parameters may take place, for example, based on the previous reconstruction parameters, the gradient of the cost function with respect to the reconstruction parameters, and the gradient of the consistency function with respect to the reconstruction parameters.

In this way, the consistency function may be taken into account as an auxiliary condition of the minimization of the cost value. By taking the gradient of the consistency function into account with respect to the reconstruction parameters, an adjustment of the reconstruction parameters may be provided in act d) by compliance with the consistency condition.

In a further embodiment of the method, the consistency function may include a consistency metric.

The consistency metric may, for example, be based on the Grangeat theorem and/or the Nyquist theorem. The consistency metric may be embodied to evaluate the consistency between reconstruction parameters and medical measuring data with respect to epipolar consistency condition and/or a sampling consistency condition and/or a symmetry consistency condition. As a result of the consistency function being based on the consistency metric, an objective evaluation of the consistency between the reconstruction parameters and the medical image data may be enabled. In this way, for example, a comparability of the at least one consistency value determined by applying the consistency function may be provided between different examination objects and/or imaging modalities and/or recording parameters and/or operating parameters of the medical imaging device.

In a further embodiment of the method, act c) may also include a determination of partial derivatives of the image values of the reconstructed medical image data with respect to the reconstruction parameters. Act c) may include a determination of partial derivatives of the cost function with respect to the image values of the reconstructed medical image data. The partial derivative of a function describes, for example, a derivative of the function (e.g., the cost function and/or the reconstruction function) with a number of arguments (e.g., the reconstruction parameters and/or the image values) in accordance with one of these arguments.

In this way, the gradient (e.g., the elements of the gradient) of the cost function may be determined (e.g., analytically) with respect to the reconstruction parameters according to the chain rule for multidimensional derivatives of the differential calculation.

For example, if the cost function is predetermined analytically, the partial derivatives of the cost function may be determined analytically with respect to the image values of the reconstructed medical image data by differentiation. In this way, for example, compared with numerical approximation methods, higher accuracy may be achieved when the gradient of the cost function is determined with respect to the reconstruction parameters.

In a further embodiment of the method, the determination of the partial derivatives of the cost function with respect to the image values of the reconstructed medical image data may take place by a back propagation of the trained function (e.g., the cost function). The input data of the back propagation may be based on the cost value.

The back propagation of a function describes, for example, an algorithm that may frequently be used to train a trained function. Training mapping data may first be determined by applying the trained function to training input data. After this, a deviation between the training mapping data and training output data may be determined by applying an error function to the training mapping data and the training output data. At least one parameter (e.g., a weighting) of the trained function (e.g., of the neural network) may be adjusted iteratively based on a gradient of the error function with respect to the at least one parameter of the trained function. In this way, the deviation between the training mapping data and the training output data may be minimized during the training of the trained function.

In a similar way, the cost value determined in act b) may be back propagated via the output layer of the trained function. In other words, the input data for the back propagation of the trained function may be based on the cost value determined in act b). In this way, the partial derivative of the cost function with respect to the image value corresponding to the respective channel may be determined at each of the channels (e.g., neurons) of the input layer of the trained function. An analytical determination of the partial derivatives of the cost function with respect to the image values of the reconstructed image data may therefore be enabled by back propagation.

In a further embodiment of the method, the reconstruction of the medical image data in act a) may include a generation of corrected reconstruction parameters by applying a correction function to the reconstruction parameters. The corrected reconstruction parameters may be provided as reconstruction parameters for the reconstruction function in act a).

In this regard, the correction function may map the (e.g., previous) reconstruction parameters onto the corrected reconstruction parameters. The correction function may be embodied to implement a movement correction and/or noise filtering and/or reduction in image artifacts (e.g., metal artifacts and/or strip artifacts and/or convolutions). This may be advantageous, for example, for the correction of rigid movements of the examination object.

A medical imaging device that is embodied to implement a computer-implemented method for the reconstruction of medical measuring data is provided. One such medical imaging device may be embodied, for example, as a medical x-ray device (e.g., C-arm x-ray device and/or Dyna-CT) and/or as a computed tomography system (CT) and/or as a magnetic resonance tomography system (MRT) and/or as a sonography system.

A processing unit (e.g., a microprocessor) that is embodied to process information and/or data and/or signals from the medical imaging device and/or further components is provided. The processing unit is embodied to send control commands to the medical imaging device and/or component parts of the medical imaging device and/or further components.

For example, the medical imaging device may include one embodiment of a processing unit. The medical imaging device (e.g., the processing unit) may, for example, be embodied to receive medical measuring data. In this regard, the medical measuring data may be received, for example, by an interface (e.g., by an electronic and/or computer-readable data memory and/or by a database). The medical imaging device (e.g., the processing unit) may be embodied to minimize a cost value via gradient descent including the act a) to e): a) reconstructing medical image data including a number of image values by applying a reconstruction function to the received medical measuring data according to reconstruction parameters; b) determining a cost value by applying a cost function to the reconstructed medical image data; c) determining a gradient of the cost value with respect to the reconstruction parameters; d) adjusting the reconstruction parameters based on the gradient of the cost value with respect to the reconstruction parameters and the previous reconstruction parameters; e) providing the adjusted reconstruction parameters, where the acts a) to e) are repeated until a termination condition is met. The reconstructed medical image data is then provided.

The medical imaging device may, for example, include a display unit (e.g., a display and/or a monitor) that is embodied to display information and/or graphical displays of information of the medical imaging device and/or the processing unit and/or further components. For example, the display unit may be embodied to display the reconstruction parameters and/or a graphical display of the reconstructed medical image data.

The advantages of the proposed medical imaging device correspond essentially to the advantages of the proposed computer-implemented method for the reconstruction of medical image data. Features, advantages, or alternative embodiments mentioned here may likewise also be transferred to the other claimed subject matter and vice versa.

In a further aspect, the present embodiments relate to a training system for providing a trained function including a training interface and a training computing unit. The training interface and/or the training computing unit are embodied for receiving reconstructed medical training image data. The training interface and/or the training computing unit are further embodied to determine a comparison cost value based on the reconstructed medical training image data, where the comparison cost value may be determined by applying the image quality metric to the reconstructed medical training image data. The training computing unit is further embodied to determine a training cost value by applying the trained function to input data, where the input data is based on the reconstructed medical training image data. The training computing unit is also embodied to adjust at least one parameter of the trained function based on a comparison of the comparison cost value and the training cost value. The training interface is also embodied to provide the trained function.

Such a training system may be configured, for example, to carry out the previously described method of the present embodiments for the reconstruction of medical image data and corresponding aspects. The training system is embodied to implement this method and the corresponding aspects by the training interface and the training computing unit being embodied to implement the corresponding method acts. The training system may be embodied to train the trained function.

A computer program or a computer program product that includes a program and may be loaded directly into a data memory of a programmable computing unit and program means (e.g., libraries and auxiliary functions) is provided in order to carry out a computer-implemented method for the reconstruction of medical image data, when the computer program or the computer program product is implemented. The computer program or the computer program product may include software containing a source code, which is still to be compiled and linked or is just to be interpreted, or an executable software code that, for execution, is only to be loaded into the processing unit. Using the computer program or the computer program product, the computer-implemented method for the reconstruction of medical image data may be performed rapidly, exactly reproducibly, and robustly. The computer program or the computer program product is configured such that the computer program or the computer program products may perform the method acts according to the present embodiments by the processing unit. Therefore, the processing unit is to have the necessary specifications such as, for example, a suitable RAM, a suitable graphics card, or a suitable logic unit in order to be able to perform the respective method acts efficiently.

An implementation based largely on software has the advantage that even processing units and/or training systems already in use may be easily upgraded by a software update in order to work in the manner according to the present embodiments. Such a computer program product may include, where relevant, in addition to the computer program, further components, such as, for example, documentation and/or additional components including hardware components, such as, for example, hardware keys (e.g., dongles, etc.) for using the software.

A data memory or data carrier, which is, for example, electronic and/or may be read electronically, for a processing unit of a medical imaging device is provided. A program code is stored in the data memory of the present embodiments and includes at least one embodiment of the computer program or the computer program product. Control information of the computer program product may be stored on the proposed data memory. The control information of the proposed data memory may be configured so that the control information carries out a method of the present embodiments when the data memory is used in a processing unit. Examples of data memories (e.g., electronic and/or electronically readable data memories) are a DVD, a magnetic tape, or a USB stick, on which electronically readable control information (e.g., software) is stored. When this control data is read from the data memory and stored in a processing unit, all the embodiments of the above-described method may be performed. The present embodiments may therefore also proceed from the aforementioned data memory.

Accordingly, the medical imaging device of the present embodiments may, for example, be the medical imaging device cited in conjunction with the data memory, the computer program, and/or the method of the present embodiments.

BRIEF DESCRIPTION OF THE DRAWINGS

Exemplary embodiments of the invention are shown in the drawings and are described in more detail below. The same reference signs are used for the same features in different figures, in which.

DETAILED DESCRIPTION

Figure 1:
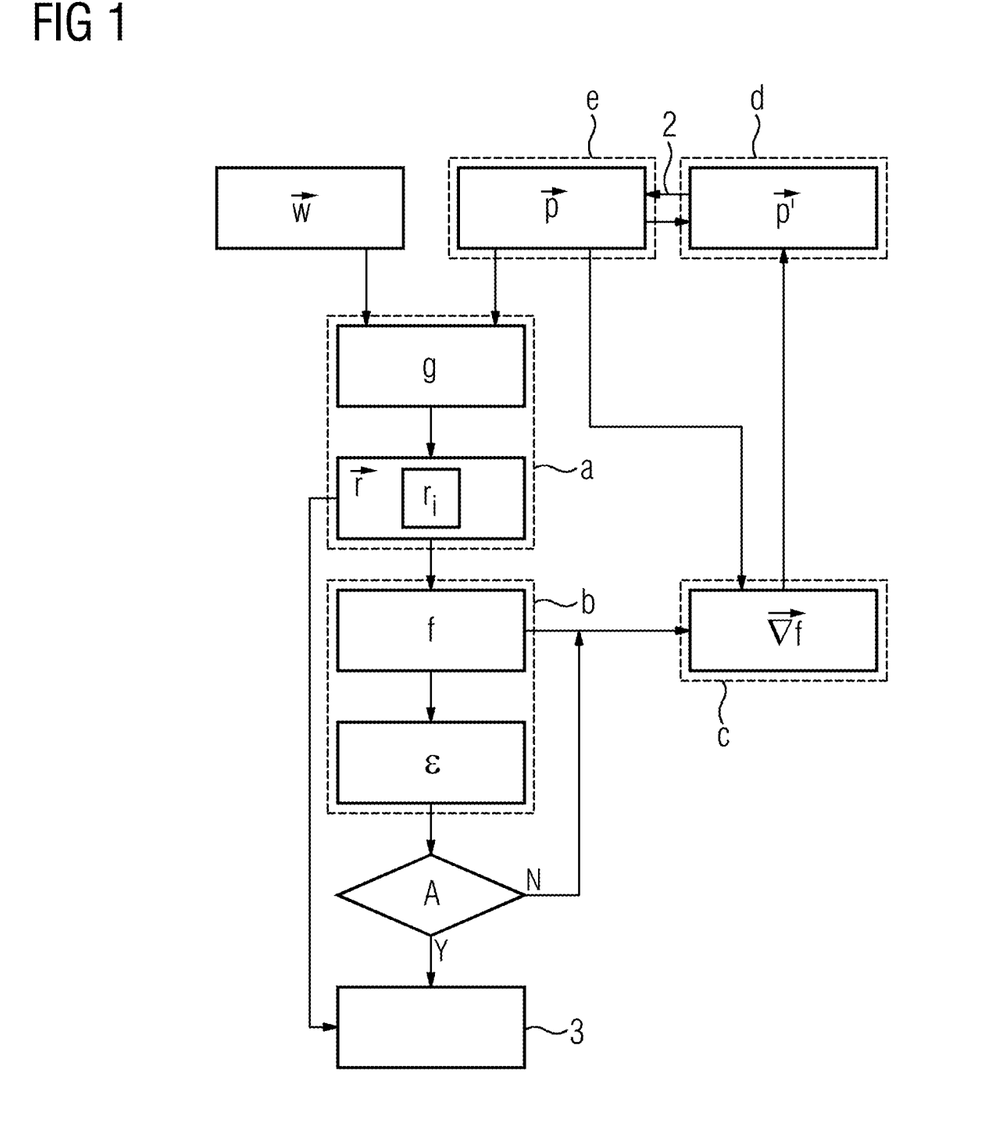
FIGS. 1 to 4 show schematic representations of exemplary embodiments of a computer-implemented method for reconstruction of medical image data.

FIG. 1 shows a schematic representation of an embodiment of a computer-implemented method for reconstruction of medical image data. In a first act, medical measuring data $\vec{w}$ may be received. In this regard, the medical measuring data $\vec{w}$ may be recorded by a medical imaging device and/or received by a medical imaging device and/or a processing unit (e.g., including one or more processors). The medical measuring data may be provided by the processing unit (e.g., the medical imaging device).

In a further act a), the medical image data $\vec{r}$, which includes a number of image values $r_i$, may be reconstructed by applying a reconstruction function g to the received medical measuring data $\vec{w}$ in accordance with reconstruction parameters $\vec{p}$. The reconstruction function g may, for example, include a mapping between the received medical measuring data $\vec{w}$ onto the medical image data $\vec{r}$:

$$\vec{r} = g(\vec{w}, \vec{p}), g: \mathbb{R}^{u+v} \to \mathbb{R}^q \quad (1),$$

where $\vec{w} \in \mathbb{R}^u$ and $\vec{p} \in \mathbb{R}^v$.

In act b), a cost value $\epsilon$ may be determined by applying a cost function $f = f(\vec{r})$ to the reconstructed medical image data $\vec{r}$. The cost function f may map the reconstructed medical image data r onto a scalar $\epsilon$:

$$\epsilon = f(\vec{r}), f: \mathbb{R}^q \to \mathbb{R}_{0,+} \quad (2).$$

Assuming that the cost function f may be differentiated (e.g., continuously) in accordance with the reconstruction parameters $\vec{p}$, in act c), a gradient $\vec{\nabla} f$ of the cost function f may be determined with respect to the reconstruction parameters $\vec{p}$. In act d), the reconstruction parameters $\vec{p}$ may be adjusted both based on the gradient of the cost function $\nabla f$ with respect to the reconstruction parameters $\vec{p}$ and also the previous reconstruction parameters $\vec{p}$. In act e), the adjusted reconstruction parameters $\vec{p}'$ may be provided 2 as reconstruction parameters for act a). Further, acts a) to e) may be repeated until a termination condition A is met.

The termination condition A may check, for example, according to act b) whether the determined cost value $\epsilon$ does not reach a predetermined threshold value. A maximum number of repetitions of acts a) to e) may be fixed by the termination condition. The termination condition A may bring about a check to determine whether the specific cost value $\epsilon$ is below a predetermined threshold value and/or the maximum number of repetitions has been reached and/or exceeded. If the termination condition A is met, the medical image data r reconstructed (e.g., finally) in step a) may be provided 3. The termination condition A may be checked according to act b).

A minimization of the cost value $\epsilon$ may be achieved via gradient descent by repeatedly implementing acts a) to e). In this regard, the reconstruction parameters $\vec{p}$ may be determined such that $$\vec{p} = \mathrm{argmin}_{\vec{p}} \tfrac{1}{2} \epsilon^2 = \mathrm{argmin}_{\vec{p}} \tfrac{1}{2} f(g(\vec{p}))^2 \quad (3)$$

where $\hat{\vec{p}}$ refers to the optimum of the reconstruction parameters $\hat{\vec{p}}$ for minimizing the cost value $\epsilon$. Further, the received measuring data $\vec{w}$ is assumed to be unchangeable (e.g., during the minimization of the cost value $\epsilon$).

The determination of the gradient of the cost function $\vec{\nabla} f$ with respect to the reconstruction parameters $\vec{p}$ may take place by determining the partial derivatives:

$$\vec{\nabla} f = \frac{\partial f}{\partial \vec{p}}. \tag{4}$$

The partial derivatives of the cost function f are, for example, required with respect to each of the reconstruction parameters $p_1, \ldots, p_v \in \vec{p}$, $$\vec{\nabla} f = \frac{\partial f}{\partial \vec{p}} = \left(\frac{\partial f}{\partial p_1}, \ldots, \frac{\partial f}{\partial p_v}\right). \tag{5}$$

The cost function f may be based on an image quality metric. The image quality metric may include, for example, a regression of a back projection error (e.g., with a movement correction).

The image quality metric may be embodied to evaluate the image quality with respect to an x-ray beam hardening and/or a signal-to-noise ratio and/or a characteristic of image artifacts (e.g., metal artifacts).

Figure 2:
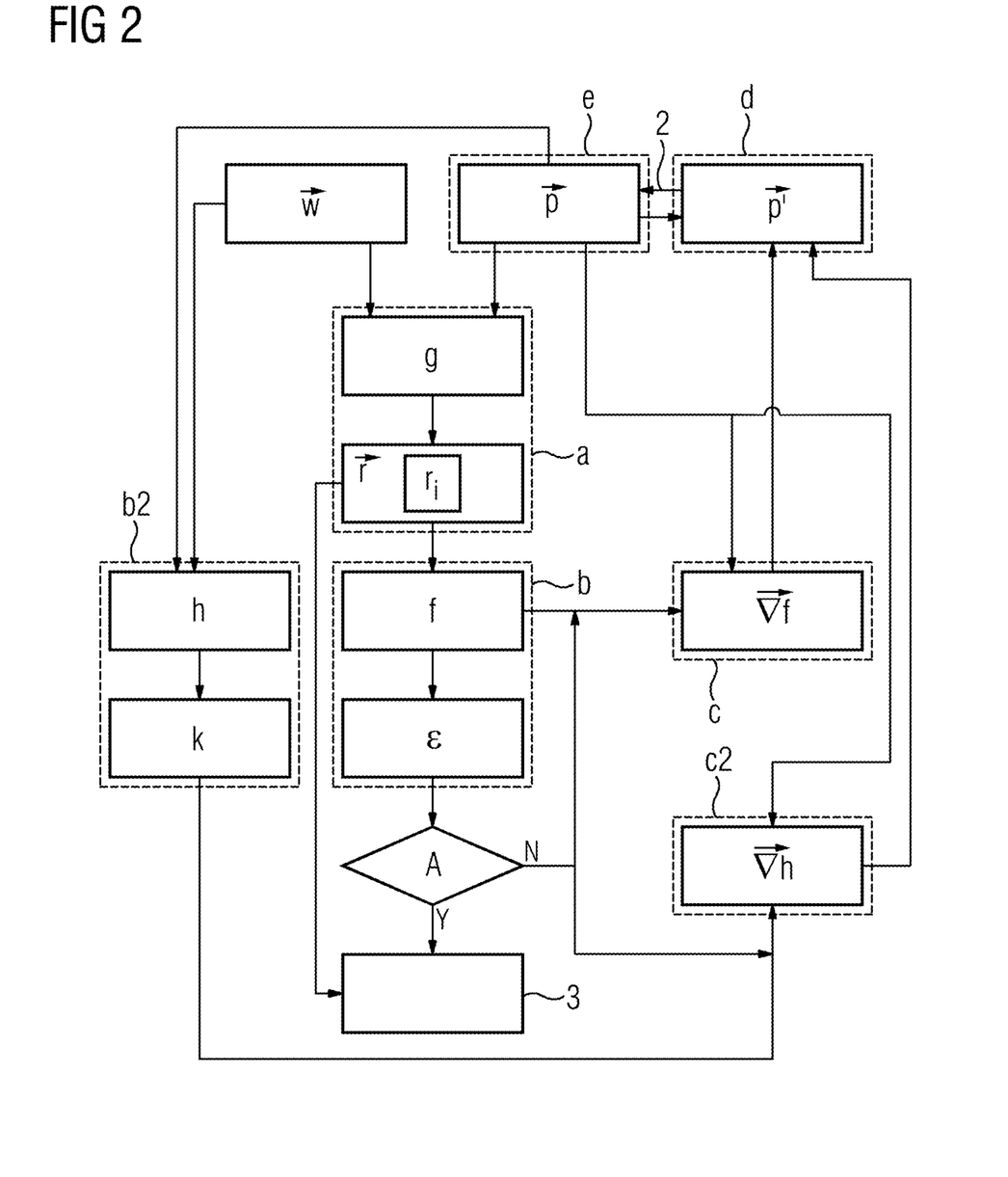

FIG. 2 shows a schematic representation of a further embodiment of the proposed computer-implemented method for the reconstruction of medical image data $\vec{r}$. In act b2, at least one consistency value K may be determined by applying a consistency function h to the measuring data $\vec{w}$ according to reconstruction parameters $\vec{p}$.

In a further act c2), a gradient of the consistency function $\vec{\nabla} h$ may be determined $\vec{p}$ with respect to the reconstruction parameters. The consistency function h may include a mapping of the received medical measuring data and the reconstruction parameters $\vec{p}$ onto a scalar k.

$$k = h(\vec{w}, \vec{p}), h: \mathbb{R}^{u+v} \to \mathbb{R}_{0,+} \tag{6}.$$

It may be assumed that the consistency function h may be differentiated (e.g., continuously) in accordance with the reconstruction parameters $\vec{p}$. The determination of the gradient $\vec{\nabla} h$ of the consistency function with respect to the reconstruction parameters $\vec{p}$ may take place similarly to the determination of the gradient of the cost function $\vec{\nabla} f$ with respect to the reconstruction parameters $\vec{p}$. In one embodiment, all partial derivatives of the consistency function h may be determined with respect to each of the reconstruction parameters $p_1, \ldots, p_v \in \vec{p}$:

$$\vec{\nabla} h = \frac{\partial h}{\partial \vec{p}} = \left(\frac{\partial h}{\partial p_1}, \ldots, \frac{\partial h}{\partial p_v}\right). \tag{7}$$

The adjustment of the reconstruction parameters $\hat{\vec{p}}$ in act d) may take place additionally based on the gradient of the consistency function $\vec{\nabla} h$ with respect to the reconstruction parameters. The optimization problem described in equation (3) may be expressed as follows:

$$\hat{\vec{p}} = \operatorname{argmin}_{\vec{p}} \tfrac{1}{2}\epsilon^2 + \lambda k = \operatorname{argmin}_{\vec{p}} \tfrac{1}{2} f(g(\vec{p}))^2 + \lambda h(\vec{w}, \vec{p}) \tag{8},$$

where $\lambda$ refers to a scalar for scaling the consistency value k of the consistency function h.

The consistency function h may include a consistency metric. For example, the consistency metric may be based on the Grangeat theorem and/or the Nyquist theorem.

The consistency metric may be embodied to evaluate the consistency between reconstruction parameters and medical measuring data with respect to an epipolar consistency condition and/or a sampling consistency condition and/or a symmetry consistency condition.

Figure 3:
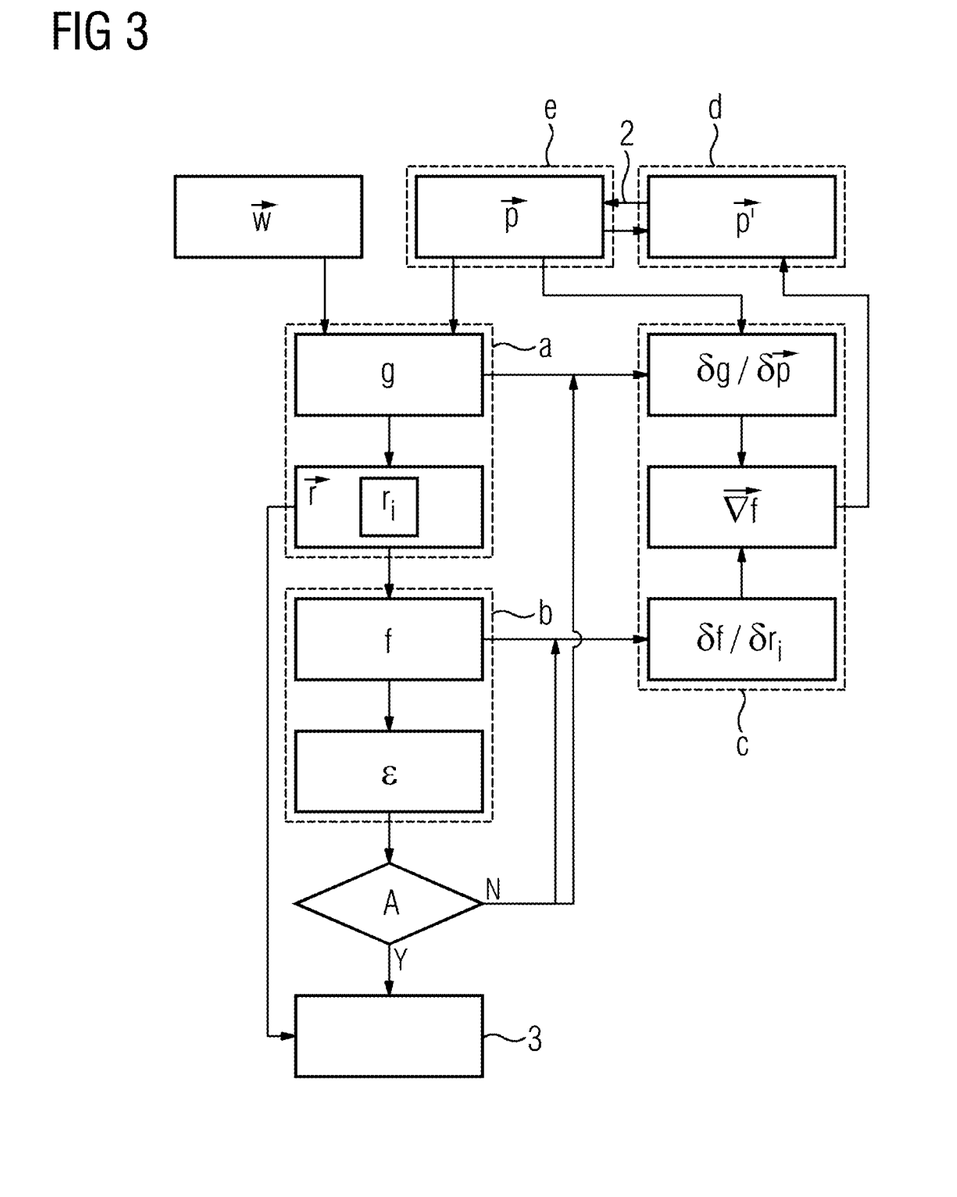

FIG. 3 shows a schematic representation of a further embodiment of the proposed computer-implemented method for the reconstruction of medical image data $\vec{r}$. Act c) may also include a determination of partial derivatives of the reconstruction function g with respect to the reconstruction parameters $\vec{p}$, $$\frac{\partial g}{\partial p_j} \forall j = 1, \ldots, v.$$

In act c), the partial derivatives of the cost function f may also be determined with respect to the image values $r_i$ of the reconstructed medical image data $\vec{r}$, $$\frac{\partial f}{\partial r_i} \forall i = 1, \ldots, q.$$

The gradient of the cost function $\vec{\nabla} f$ with respect to the reconstruction parameters $\vec{p}$ may be determined (e.g., analytically) in accordance with the chain rule for multidimensional derivatives of the differential computation.

$$\frac{\partial f}{\partial p_j} = \frac{\partial f(g(\vec{p}))}{\partial p_j} = \sum_{i=1}^{q} \frac{\partial f}{\partial r_i} \frac{\partial g}{\partial p_j}. \tag{9}$$

thus applies to the partial derivatives of the cost function f in accordance with each of the reconstruction parameters $p_1, p_v \in \hat{\vec{p}}$ in equation (5).

Figure 4:
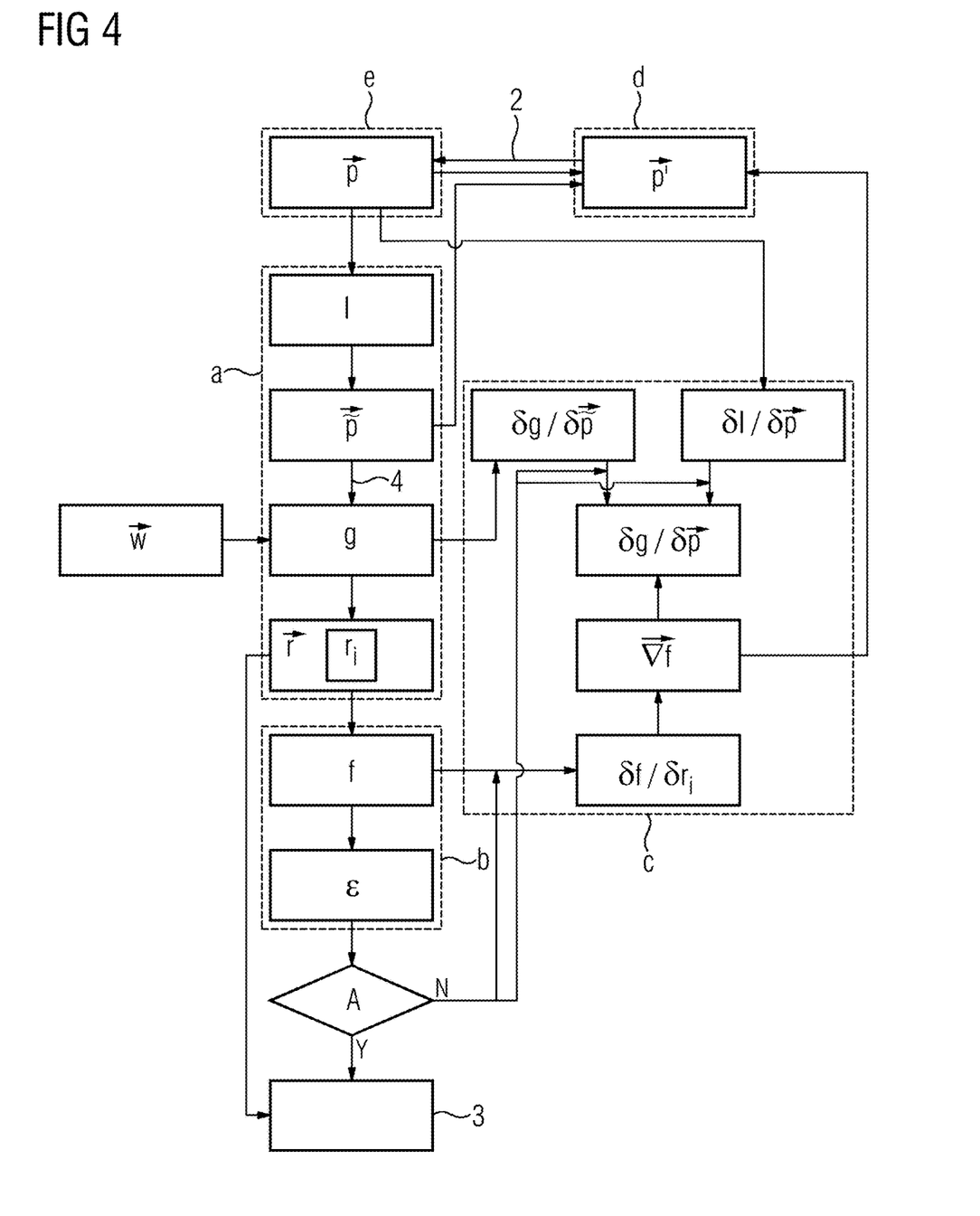

FIG. 4 shows a schematic representation of a further embodiment of the computer-implemented method. Act a) may further include a generation of corrected reconstruction parameters $\tilde{\vec{p}}$ by applying a correction function l to the reconstruction parameters $\vec{p}$. The correction function l may map the reconstruction parameters $\vec{p}$ onto the corrected reconstruction parameters $\tilde{\vec{p}}$:

$$\tilde{\vec{p}} = l(\vec{p}), l: \mathbb{R}^v \to \mathbb{R}^v \tag{10}.$$

The corrected reconstruction parameters p may be provided as reconstruction parameters $\vec{p}$ for the reconstruction function in act a).

$$\vec{r} = g(\vec{w}, \tilde{\vec{p}}) = g(\vec{w}, l(\vec{p})) \tag{11}$$

results from equations (1) and (10).

$$\frac{\partial g}{\partial p_j} = \frac{\partial g}{\partial \vec{p}_i} \frac{\partial l}{\partial p_j} \quad (12)$$

therefore applies in order to determine the gradient of the partial derivatives of the reconstruction function g according to each of the reconstruction parameters $\vec{p}$ in equation (9).

Outlined below by way of example is a three-dimensional movement correction during the reconstruction of medical image data from two-dimensional projection x-ray images as medical measuring data w of an examination object. The correction function l may be embodied, for example, in order to correct a rigid movement of the examination object. A rigid three-dimensional movement may be described by a homogenous movement matrix $M(\vec{p}) \in \mathbb{R}^{4 \times 4}$, where $\vec{p} \in \mathbb{R}^6$. In this regard, the correction function l may include the homogenous movement matrix M.

Recording parameters (e.g., an acquisition geometry) of the received medical measuring data $\vec{w}$ may be described by a projection matrix $D \in \mathbb{R}^{3 \times 4}$. The reconstruction function g may include the projection matrix D. First, the received medical measuring data may be interpolated:

$$s(\varphi,\rho): \mathbb{R}^2 \to \mathbb{R} \quad (13),$$

where s refers to a continuous function along the two spatial directions $\varphi$ and $\rho$.

A movement-compensated image value $r_i$ of the medical image data $\vec{r}$ (with $r_i \in \vec{r}$) may be determined according to:

$$r_i = r_i^0 + s(\varphi,\rho) \quad (14)$$

where $\varphi = [DMx_i]_1 / [DMx_i]_3 \quad (15)$ and $\rho = [DMx_i]_2 / [DMx_i]_3 \quad (16),$ where $[\cdot]_z$ extracts the row z from the respective matrix, $r_i^0$ refers to the sealing value of an x-ray slice image reconstructed without projection s, and $x_i \in \mathbb{R}^4$ describes spatial positions of the image values $r_i$ (e.g., of the voxels) in homogenous coordinates.

$$\frac{\partial r_i}{\partial \vec{p}} = \frac{\partial r_i}{\partial \varphi} \frac{\partial \varphi}{\partial \vec{p}} + \frac{\partial r_i}{\partial \rho} \frac{\partial \rho}{\partial \vec{p}} \quad (17)$$

results from the equations (14) to (16) (and similarly to equation (12)).

In equation (17), $$\frac{\partial r_i}{\partial \varphi} \text{ and } \frac{\partial r_i}{\partial \rho}$$

correspond to the numerical derivatives of the projection x-ray image along the rows and columns. Further, $$\frac{\partial \varphi}{\partial \vec{p}} \text{ and } \frac{\partial \rho}{\partial \vec{p}}$$

are determined analytically.

Figure 5:
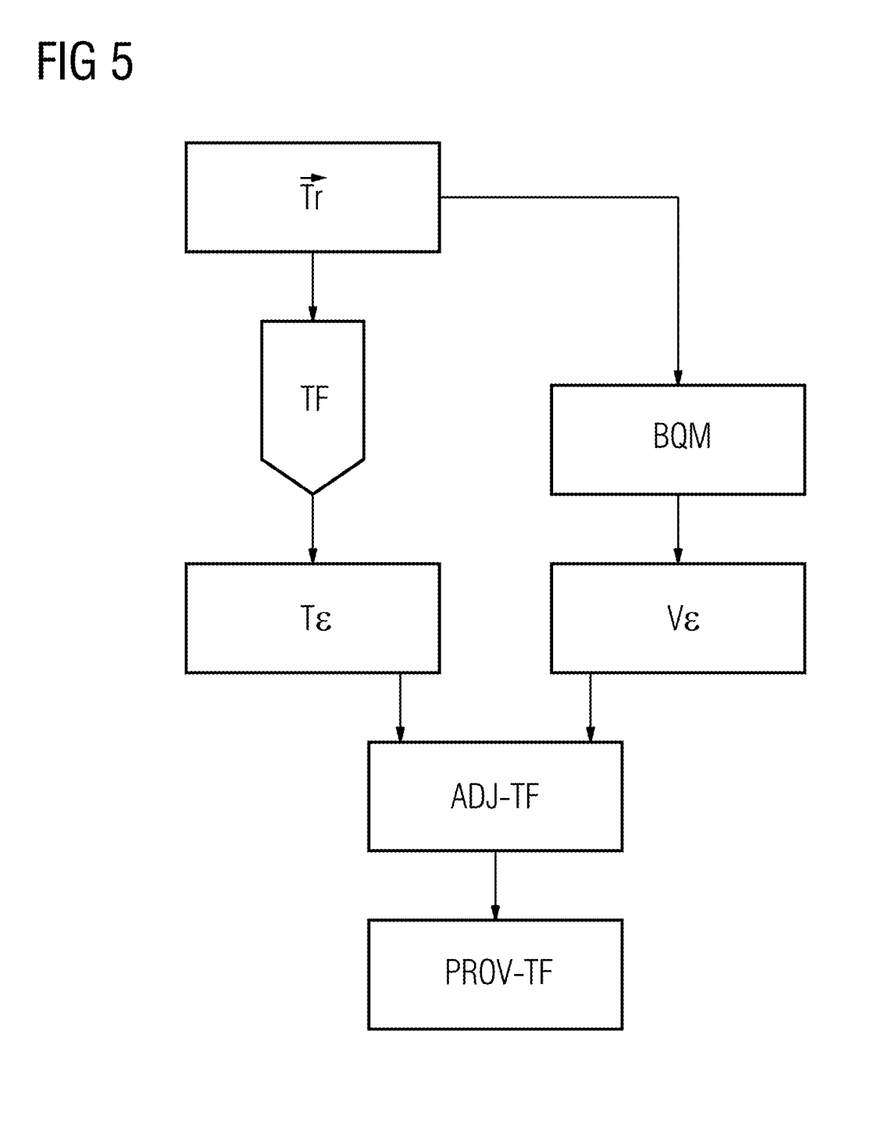
FIG. 5 shows a schematic flow diagram for providing a trained function.

FIG. 5 shows a schematic flow diagram of one embodiment of a method for providing a trained function TF. The cost function f may include a trained function TF. For example, the trained function TF may be applied to the reconstructed medical image data $\vec{r}$ as a cost function f in act b) for determining the cost value $\epsilon$.

The cost value $\epsilon$ may be determined by applying the trained function TF to the input data, where the input data may be based on the reconstructed medical image data $\vec{r}$ including a number of image values $r_i$. Further, at least one parameter of the trained function TF may be based on the image quality metric.

In order to provide the trained function TF, in a first act, reconstructed medical training image data $\vec{Tr}$ may be received, for example, by a training interface TIF and/or a training computing unit TCU. The reconstructed medical training image data $\vec{Tr}$ may be reconstructed, for example, by applying the reconstruction function g to medical training measuring data in accordance with training reconstruction parameters.

A further act may include the determination of a training cost value $T\epsilon$ by applying the trained function TF to input data (e.g., using the training computing unit TCU). The input data may, for example, be based on the reconstructed medical training image data. In this regard, the trained function TF may be a neural network (e.g., a convolutional neural network or a network including a convolutional layer).

A comparison cost value $V\epsilon$ that corresponds to the respective reconstructed medical training image data $\vec{Tr}$ may be determined. The comparison cost value $V\epsilon$ may be determined by applying the image quality metric BQM to the reconstructed medical training image data $\vec{Tr}$ (e.g., using the training computing unit TCU).

In a further act ADJ-TF, at least one parameter of the trained function TF may be adjusted (e.g., using the training computing unit TCU) based on a comparison of the comparison cost value $V\epsilon$ and the training cost value $T\epsilon$. In this exemplary embodiment, the trained function TF may include an artificial neural network. The adjustment of the artificial neural network may include the adjustment of at least one edge weight of the artificial neural network. Further, the adjustment may be based on a back propagation algorithm.

In act PROV-TF, the trained function TF may be provided, for example, by the training interface TIF and/or the training computing unit TCU. In the exemplary embodiment shown, the trained function TF may be stored. Alternatively, the trained function TF (or one or more of its parameters) may also be indicated or transmitted for further processing.

Further, the partial derivatives of the cost function f may be determined with respect to the image values $r_i$ of the reconstructed medical image data $\vec{r}$ in equation (9) using a back propagation of the trained function TF. The input data of the back propagation may be based on the cost value $\epsilon$.

Figure 6:
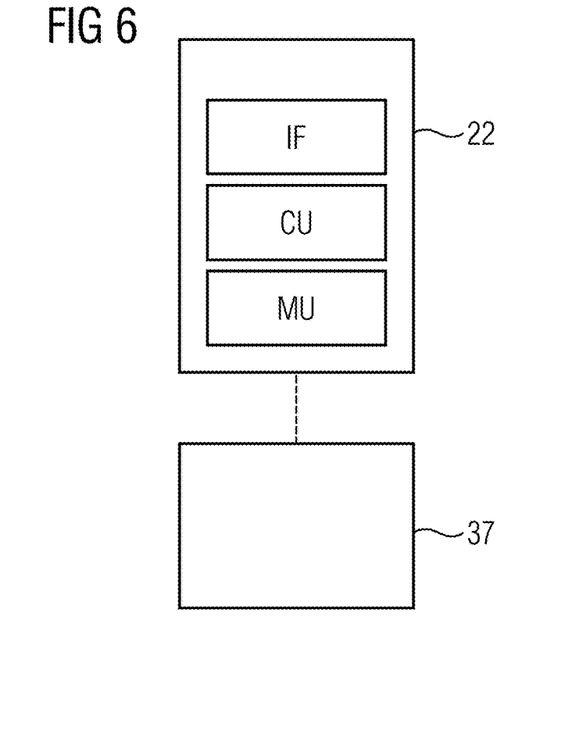
FIG. 6 shows an exemplary embodiment of a processing unit.
Figure 7:
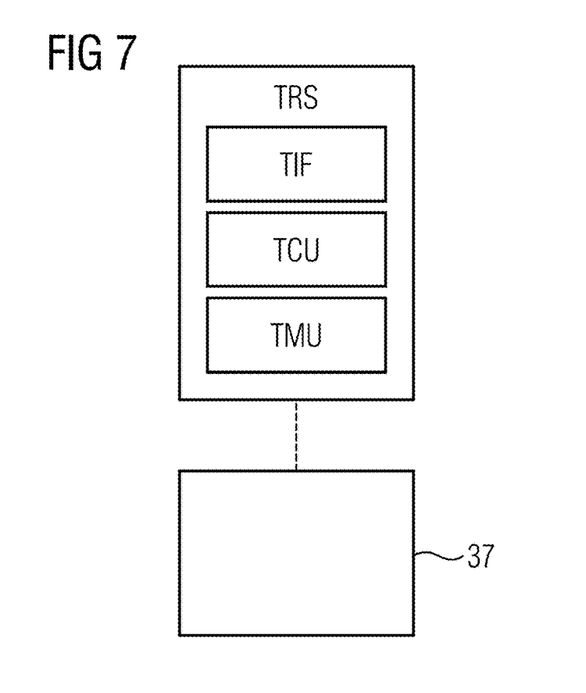
FIG. 7 shows an exemplary embodiment of a training system.

FIG. 6 shows one embodiment of a processing unit 22, and FIG. 7 shows one embodiment of a training system TRS. The processing unit 22 shown may be embodied to carry out one embodiment of a computer-implemented method for the reconstruction of medical image data $\vec{r}$. The training system TRS shown may be embodied to implement a method for providing a trained function TF. The processing unit 22 may include an interface IF, a computing unit CU, and a memory unit MU. The training system TRS may include a training interface TIF, a training computing unit TCU, and a training memory unit TMU.

The processing unit 22 and/or the training system TRS may be, for example, a computer, a microcontroller, or an integrated switching circuit. Alternatively, the processing unit 22 and/or the training system TRS may be a real group of computers (e.g., a cluster) or a virtual group of computers (e.g., a "cloud"). The processing unit 22 and/or the training system TRS may also be embodied as a virtual system that is executed on a real computer or a real (e.g., cluster) or virtual (e.g., cloud) group of computers (e.g., virtualization).

An interface IF and/or a training interface TIF may be a hardware or software interface (e.g., PCI bus, USB, or Firewire). A computing unit CU and/or a training computing unit TCU may have hardware elements or software elements (e.g., a microprocessor or a field programmable gate array (FPGA)). A memory unit MU and/or a training memory unit TMU may be realized as a random access memory (RAM) or as a permanent mass memory (e.g., hard disk, USB stick, SD card, solid state disk).

The interface IF and/or the training interface TIF may, for example, include a number of sub interfaces that implement different acts of the respective method. In other words, the interface IF and/or the training interface TIF may also be a plurality of interfaces IF or a plurality of training interfaces TIF. The computing unit CU and/or the training computing unit TCU may, for example, include a number of sub computing units that implement different acts of the respective method. In other words, the computing unit CU and/or the training computing unit TCU may also be a plurality of computing units CU or a plurality of training computing units TCU.

The interface IF of the processing unit 22 may, for example, be embodied to receive the medical measuring data $\vec{w}$. The computing unit CU may be configured to reconstruct the medical image data $\vec{r}$, including a number of image values $r_i$, by applying the reconstruction function g to the received medical measuring data $\vec{w}$. The computing unit CU may be embodied to determine the cost value $\epsilon$ with respect to the reconstruction parameters $\vec{p}$. The computing unit CU may be embodied to adjust the reconstruction parameters $\vec{p}$ both based on the gradient of the cost function $\vec{\nabla}f$ with respect to the reconstruction parameters $\vec{p}$ and also on the previous reconstruction parameters $\vec{p}$. The computing unit CU and/or the interface IF may be embodied to provide the adjusted reconstruction parameters $\vec{p}'$. The interface IF may be embodied to provide the reconstructed medical image data $\vec{r}$.

The training interface TIF may be embodied to receive the reconstructed medical training image data $\vec{Tr}$. In addition, the training computing unit TCU may also be embodied to determine a comparison cost value $V\epsilon$ based on the reconstructed medical training image data $\vec{Tr}$. The training computing unit TCU may be embodied to determine a training cost value $T\epsilon$ by applying the trained function TF to input data, where the input data is based on the reconstructed medical training image data $\vec{TR}$. Further, the training computing unit TCU may be embodied to adjust ADJ-TF at least one parameter of the trained function TF based on a comparison of the comparison cost value $V\epsilon$ and the training cost value $T\epsilon$. The training interface TIF may also be embodied to provide PROV-TF the trained function TF.

Figure 8:
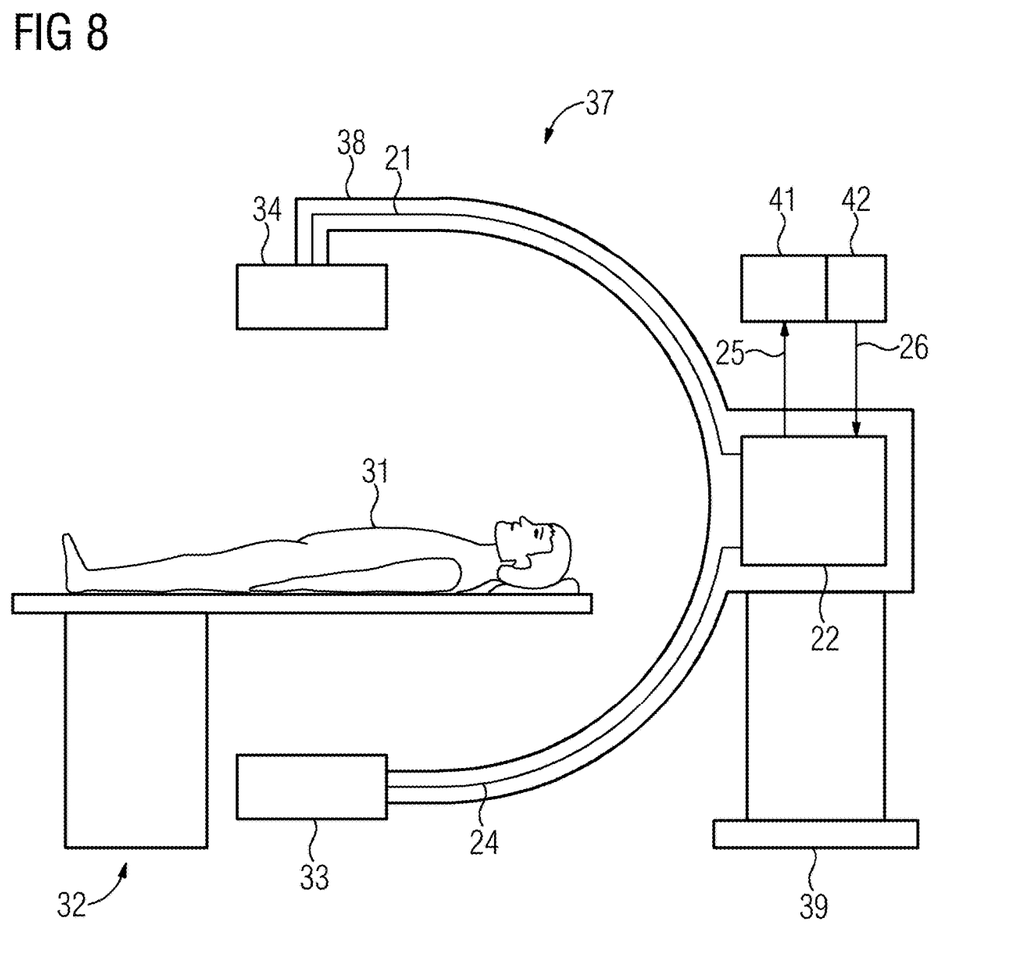
FIG. 8 shows a schematic representation of one embodiment of a C-arm x-ray device.

FIG. 8 shows a schematic representation of one embodiment of a medical C-arm x-ray device 37 as an example of a medical imaging device. The medical C-arm X-ray device may be embodied to implement an embodiment of the computer-implemented method. In this regard, the medical C-arm x-ray device 37 includes a detector unit 34, an x-ray source 33, and a processing unit 22. In order to receive the medical measuring data $\vec{w}$ (e.g., of projection x-ray images), the arm 38 of the C-arm x-ray device may be mounted movably about one or more axles. In this way, the medical measuring data $\vec{w}$ may be recorded with, in each case, recording parameters (e.g., acquisition geometries) that differ in relation to one another. The medical C-arm x-ray device 37 also includes a movement device 39 that enables a movement of the C-arm x-ray device 37 in the space.

In order to record the medical measuring data $\vec{w}$ of a region to be mapped of an examination object arranged on a patient support device 32, the processing unit 22 may send a signal 24 to the x-ray source 33. Hereupon, the x-ray source 33 may send an x-ray beam bundle (e.g., a cone beam and/or fan beam). When the x-ray beam bundle strikes a surface of the detector unit 34 after interaction with the region of the examination object 31 to be mapped, the detector unit 34 may send a signal 21 to the processing unit 22. The processing unit 22 may receive the medical measuring data $\vec{w}$ with the aid of the signal 21, for example. The processing unit 22 may then implement an embodiment of the computer-implemented method for the reconstruction of medical image data $\vec{r}$.

The medical C-arm x-ray device 37 may include an input unit 41 (e.g., a keyboard) and/or a display unit 42 (e.g., a monitor and/or display). The input unit 41 may be integrated into the display unit 42 (e.g., with a capacitive input display). In this way, control of the method and/or the medical C-arm x-ray device 37 may be enabled by an operator inputting on the input unit 41. For example, a graphical display of the reconstructed medical image data $\vec{r}$ and/or the cost value $\epsilon$ and/or the reconstruction parameters $\vec{p}$ may be shown on the display unit 42.

The schematic representations contained in the described figures do not show anything to scale or proportion.

The methods described in detail above and the presented apparatuses are merely exemplary embodiments that may be modified by a person skilled in the art in many ways without departing from the scope of the invention. In addition, the use of the indefinite article "a" or "an" does not rule out the possibility of there also being more than one of the features concerned. Similarly, the expressions "unit" and "module" do not preclude the components in question from including a plurality of cooperating partial components that may also be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for reconstruction of medical image data, the computer-implemented method comprising:
receiving medical measuring data;
minimizing a cost value via gradient descent, the minimizing comprising:
reconstructing the medical image data, which includes a number of image values, the reconstructing comprising applying a reconstruction function to the received medical measuring data in accordance with reconstruction parameters;
determining a cost value, the determining of the cost value comprising applying a cost function to the reconstructed medical image data, wherein the cost function is based on an image quality metric;
determining a gradient of the cost function with respect to the reconstruction parameters;
adjusting the reconstruction parameters based on the gradient of the cost function with respect to the reconstruction parameters and the previous reconstruction parameters;
providing the adjusted reconstruction parameters; and
repeating the reconstructing, the determining of the cost value, the determining of the gradient, the adjusting, and the providing until a termination condition is met; and
providing the reconstructed medical image data.

2. The computer-implemented method of claim 1, wherein the termination condition comprises a maximum number of repetitions, a threshold value with respect to the cost value, or the maximum number of repetitions and the threshold value.

3. The computer-implemented method of claim 1, wherein the cost function comprises a trained function,
wherein applying the cost function to the reconstructed medical image data comprises applying the trained function to input data,
wherein the input data is based on the reconstructed medical image data, which includes a number of image values, and
wherein at least one parameter of the trained function is based on the image quality metric.

4. The computer-implemented method of claim 1, wherein minimizing the cost value via gradient descent further comprises:
determining at least one consistency value, the determining of the at least one consistency value comprising applying a consistency function to the medical measuring data in accordance with the reconstruction parameters; and
determining a gradient of the consistency function with respect to the reconstruction parameters,
wherein adjusting the reconstruction parameters further comprises:
adjusting the reconstruction parameters additionally based on the gradient of the consistency function with respect to the reconstruction parameters.

5. The computer-implemented method of claim 4, wherein the consistency function comprises a consistency metric.

6. The computer-implemented method of claim 1, wherein determining the gradient of the cost function with respect to the reconstructions parameters comprises:
determining partial derivatives of the reconstruction function with respect to the reconstruction parameters; and
determining partial derivatives of the cost function with respect to the image values of the reconstructed medical image data.

7. The computer-implemented method of claim 6, wherein the cost function comprises a trained function,
wherein determining the partial derivatives of the cost function with respect to the image values of the reconstructed medical image data takes place using a back propagation of the trained function, and
wherein input data of the back propagation is based on the cost value.

8. The computer-implemented method of claim 1, wherein reconstructing the medical image data further comprises:
generating corrected reconstruction parameters, the generating of the corrected reconstruction parameters comprising applying a correction function to the reconstruction parameters; and
providing the corrected reconstruction parameters as reconstruction parameters for the reconstruction function.

9. In a non-transitory computer-readable storage medium that stores instructions executable by one or more processors of a medical imaging device for reconstruction of medical image data, the instructions comprising:
receiving medical measuring data;
minimizing a cost value via gradient descent, the minimizing comprising:
reconstructing the medical image data, which includes a number of image values, the reconstructing comprising applying a reconstruction function to the received medical measuring data in accordance with reconstruction parameters;
determining a cost value, the determining of the cost value comprising applying a cost function to the reconstructed medical image data, wherein the cost function is based on an image quality metric;
determining a gradient of the cost function with respect to the reconstruction parameters;
adjusting the reconstruction parameters based on the gradient of the cost function with respect to the reconstruction parameters and the previous reconstruction parameters;
providing the adjusted reconstruction parameters; and
repeating the reconstructing, the determining of the cost value, the determining of the gradient, the adjusting, and the providing until a termination condition is met; and
providing the reconstructed medical image data.

10. The non-transitory computer-readable storage medium of claim 9, wherein the termination condition comprises a maximum number of repetitions, a threshold value with respect to the cost value, or the maximum number of repetitions and the threshold value.

11. The non-transitory computer-readable storage medium of claim 9, wherein the cost function comprises a trained function,
wherein applying the cost function to the reconstructed medical image data comprises applying the trained function to input data,
wherein the input data is based on the reconstructed medical image data, which includes a number of image values, and
wherein at least one parameter of the trained function is based on the image quality metric.

12. The non-transitory computer-readable storage medium of claim 9, wherein minimizing the cost value via gradient descent further comprises:
   determining at least one consistency value, the determining of the at least one consistency value comprising applying a consistency function to the medical measuring data in accordance with the reconstruction parameters; and
   determining a gradient of the consistency function with respect to the reconstruction parameters,
   wherein adjusting the reconstruction parameters further comprises:
      adjusting the reconstruction parameters additionally based on the gradient of the consistency function with respect to the reconstruction parameters.

13. The non-transitory computer-readable storage medium of claim 12, wherein the consistency function comprises a consistency metric.

14. The non-transitory computer-readable storage medium of claim 9, wherein determining the gradient of the cost function with respect to the reconstructions parameters comprises:
   determining partial derivatives of the reconstruction function with respect to the reconstruction parameters; and
   determining partial derivatives of the cost function with respect to the image values of the reconstructed medical image data.

15. The non-transitory computer-readable storage medium of claim 14, wherein the cost function comprises a trained function,
   wherein determining the partial derivatives of the cost function with respect to the image values of the reconstructed medical image data takes place using a back propagation of the trained function, and
   wherein input data of the back propagation is based on the cost value.

16. The non-transitory computer-readable storage medium of claim 9, wherein reconstructing the medical image data further comprises:
   generating corrected reconstruction parameters, the generating of the corrected reconstruction parameters comprising applying a correction function to the reconstruction parameters; and
   providing the corrected reconstruction parameters as reconstruction parameters for the reconstruction function.

17. A medical imaging device comprising:
   a processor configured to:
      receive medical measuring data;
      minimize a cost value via gradient descent, the minimization comprising:
         reconstruction of the medical image data, which includes a number of image values, the reconstruction comprising application of a reconstruction function to the received medical measuring data in accordance with reconstruction parameters;
         determination of a cost value, the determination of the cost value comprising application of a cost function to the reconstructed medical image data, wherein the cost function is based on an image quality metric;
         determination of a gradient of the cost function with respect to the reconstruction parameters;
         adjustment of the reconstruction parameters based on the gradient of the cost function with respect to the reconstruction parameters and the previous reconstruction parameters;
         provision of the adjusted reconstruction parameters; and
         repetition of the reconstruction, the determination of the cost value, the determination of the gradient, the adjustment, and the provision until a termination condition is met; and
      provide the reconstructed medical image data.

\* \* \* \* \*